United States Patent Office 2,740,709
Patented Apr. 3, 1956

2,740,709

PROCESS OF PURIFYING REFRACTORY METALS

Schuyler A. Herres and Ernest G. Kendall, Las Vegas, Nev., assignors to Titanium Metals Corporation of America, Pittsburgh, Pa., a corporation of Pennsylvania No Drawing. Application November 24, 1952, Serial No. 322,338

2 Claims. (Cl. 75—121)

This invention relates to a method for purifying a refractory metal such as titanium or zirconium, more particularly when such metal is contaminated with magnesium or an alkaline earth metal in metallic form, and in the form of a halide salt.

Titanium metal, for example may be produced by the so-called "Kroll" process wherein titanium tetrachloride is reacted with a reducing metal such as magnesium. The titanium metal is produced in the form of a sponge which is contaminated with magnesium chloride as a result of the reaction; and also with metallic magnesium which is added originally in excess to the reaction mass. Purification of the titanium sponge is necessary before it becomes suitable for further processing or final use. It has heretofore been proposed to leach out the magnesium and magnesium chloride by treatment with water and acid, or alternatively remove these contaminants by distillation at high temperature under vacuum. Distillation involves a long time treatment at high temperature under high vacuum and requires expensive heat and pressure resistant equipment, large pumps and other paraphernalia. Leaching with water and acid has been found to be simple as far as equipment and processing are concerned but, as heretofore produced, the leached product has been found to be unsuitable for subsequent arc melting.

Accordingly it is the principal object of this invention to provide a method for purifying contaminated refractory metal which will render such metal amenable to arc melting. A further object of this invention is to provide a simple and effective method for removing contaminants from refractory metals. These and other objects of this invention will become apparent from the following complete and detailed description thereof.

In its broadest aspects, this invention contemplates a method for removing contaminants from, and thereby purifying a refractory metal, in which the contaminated metal is first comminuted to a particle size generally not coarser than about ½ inch, then washed by a relatively large volume of water to dissolve and remove soluble chlorides, then treated to remove reducing metals, such as magnesium and alkaline earth metals, by immersion in an acid aqueous solution.

Comminution of the contaminated metal is best accomplished by employing apparatus which in its subdividing action does not tend to deform the ductile metal particles so as to foster the inclusion of contaminants within the particles so that they cannot be reached by subsequent washing operations. Cutting with a machine tool has been found to produce chips which are suitable for subsequent treatments, and in the case where metal is produced originally in a container or metallic crucible and removed therefrom by a boring operation, the machine tool may be of such design and its action adjusted to produce chips of the required size. Oversize chips, of original metal larger than about ½ inch may be reduced by careful milling in an impact mill, for example a hammer mill, or a saw-tooth crusher, providing the action is not excessive and the material is not passed repeatedly through the mill.

It is preferred that the comminuted metal contain a major portion of its particles between 20 mesh and 4 mesh. Particles larger than about ½ inch will be found to be difficult to treat in subsequent washing steps and a preponderance of particles less than 20 mesh will result in an undesirably high total surface area with resulting possibility of surface reactions or other disadvantageous effects and also involve greater handling difficulties.

After comminution, the metal is preferably, but not essentially, separated into fractions of more or less uniform particle size. It will be ordinarily found convenient to separate into two fractions, minus 20 mesh, and plus 20 minus 4 mesh for most effective operation of the following washing step.

Magnesium chloride is then separated by spraying the comminuted metal with water. The metal particles are spread out on a screen preferably in a layer of not more than an inch, or thereabouts, deep; the screen being vibrated or shaken by mechanical means to insure exposure of all surfaces to the water. Dissolution of magnesium chloride is accompanied by generation of considerable heat and the water spray is adjusted to provide sufficient water to dissolve the chloride and in addition to prevent the temperatures of the metal from being raised to any appreciable extent. It is a feature of this invention that sufficient water is applied to the impure metal in the form of a spray to dissolve the water soluble chloride contaminants without raising the temperature of the metal much above normal room temperature, and in any event not above about 30° C. It will be appreciated that this will involve a somewhat heavy spray with a substantial excess over that required theoretically to dissolve the salt in order to accomplish the necessary cooling action. In addition it will be found advantageous to employ forceful sprays so as to take advantage of the hydraulic washing effect which removes a considerable amount of oxydic material and other finely divided impurities. The spray washing is also advantageous in that fresh washing solution is continuously applied to the sponge metal and contact for any appreciable length of time with magnesium chloride solution is avoided.

The various fractions of impure metal are best sprayed separately since optimum dissolution and cooling effects may require different rates of application of sprayed water. Spraying conditions, including the length of time under the sprays, are arranged to provide substantially complete elimination from the metal of soluble salts.

After water washing, the metal particles are preferably immediately immersed in an acid aqueous solution to dissolve and remove metallic contaminants, for instance metallic magnesium. This solution will contain an acid suitable for dissolving the contaminant metal; in the case of titanium metal reduced by the action of magnesium, a hydrochloric or nitric acid solution of from about 2% to about 10% strength will be found effective to dissolve the residual metallic magnesium. The amount of acid solution and its strength will be determined by the amount of magnesium it is necessary to dissolve. It is preferable to employ a definite excess of acid, say 10% or 20% or even more over the amount theoretically required and the amount should be such as to insure a concentration of hydrogen ion in the spent acid solution, after treatment of the metal, of at least about 0.1 gram per liter. It has been found that when the final acidity of the spent acid is lower than about 0.1 gram per liter of hydrogen the quality of the metal may be adversely affected. In addition the acid solution preferably contains an oxidizing agent, for instance ferric chloride or sodium nitrate which aside from its application in the process herein described forms no part of this invention. The metal particles are transferred to a tank containing the acid solution and agitated therein by suitable means, preferably by compressed air, to provide best conditions for reaction of the acid with the magnesium. Complete dissolution of the metallic magnesium under these conditions is not rapidly accomplished and a period of time, often of the order of several hours may be required for complete solution. The purified metal is then removed from contact with the acid, rinsed with water, and then dried preferably at a temperature not above about 200° C. It will be found to be free from magnesium contaminants and can readily be melted in an arc furnace without splattering or causing arc instability.

A preferred procedure involves screening the sponge metal into two fractions, that is minus 4 plus 20 mesh and minus 20 mesh and then washing the minus 4 plus 20 fraction with water as described. The water wash may, however, be omitted from the treatment of the minus 20 mesh and this material may be directly treated with acid in the same manner as described for washed metal.

The following example illustrates the practice of a selected embodiment of the instant invention.

*Example*

A batch of 100 lbs. impure titanium metal, obtained by reduction of titanium tetrachloride with magnesium, was removed from the reaction pot by boring. The bored chips contained 11% of particle size greater than 4 mesh and this oversize material was milled lightly in a saw-tooth crusher to reduce it to minus 4 mesh which was then recombined with the original minus 4 mesh fraction. The combined minus 4 mesh material was then separated into 2 fractions; plus 20 mesh minus 4 mesh and minus 20 mesh. The composition of each of these fractions was determined as follows:

Minus 4 plus 20, 90 pounds:   Per cent
 Ti metal _____ 60
 Mg metal _____ 9.2
 Mg chloride _____ 30.8

Minus 20 mesh, 10 pounds:   Per cent
 Ti metal _____ 40
 Mg metal _____ 11.8
 Mg chloride _____ 48.2

The minus 4 plus 20 mesh fraction was washed on a vibrating 28 mesh screen with forceful spray of water, providing about 5 gallons per minute per square foot of screen area. This amount of water was sufficient to dissolve $MgCl_2$ in the impure titanim metal and also to prevent any appreciable temperature rise in the metal. The sprayed water therefore acted as a solvent for the magnesium chloride and also as a coolant to counteract the high heat of solution of this salt. The metal particles were maintained under the water spray until substantially all the $MgCl_2$ had been dissolved.

The washed minus 4 plus 20 fraction was then slowly fed into a tank containing a water solution of 7% HCl and 7% $NaNO_3$ the amount of HCl present being sufficient to insure a concentration of hydrogen ion in the spent acid after dissolution of the magnesium of 0.3 gram per liter. The addition of the material to the acid material was regulated so as to maintain the temperature of the solution below 95° C. The mixture in the tank was agitated by admission of compressed air in the bottom of the tank; this method of agitating also assisted in maintaining oxidizing conditions during acid treatment. The unwashed minus 20 mesh material was similarly treated in a separate acid bath.

Samples of the metal particles were removed from the acid solution at intervals and tested for residual magnesium by immersing in a 10% solution of hydrochloric acid. After a 2 hour treatment period no reaction was noted between the samples and 10% acid and after an additional ½ hour treatment period the compressed air was shut off, the metal allowed to settle in the tanks and the spent acid separated. The metal was then rinsed with water to remove residual acid solution, the fractions combined and dried at a temperature of about 150° C.

The so-purified metal was successfully melted in an arc furnace without difficulty due to splattering, and the arc was stable during the entire melting operation.

While this invention has been described and illustrated by the example shown, it is not intended to be strictly limited thereto and other variations and modifications may be employed within the limits of the following claims.

We claim:

1. A process for purifying a refractory metal contaminated with a reducing metal and a halide of said reducing metal which comprises; comminuting said metal to a particle size of less than about 4 mesh, washing said comminuted metal, without intermediate acid treatment, employing a spray of excess water thereby to dissolve reducing metal chloride and to maintain the temperature of said refractory metal below about 30° C., subsequently immersing said washed metal in an aqueous acid solution until the reducing metal is dissolved, said acid solution being of such strength and in amount that the hydrogen ion content of the spent acid after treatment of the metal is not lower than 0.1 gram per liter, and rinsing and drying said metal.

2. A process for purifying a refractory metal contaminated with a reducing metal and a halide of said reducing metal which comprises; comminuting said metal to a particle size of less than about 4 mesh and with a major portion thereof larger than 20 mesh, washing said comminuted metal, without intermediate acid treatment, employing a spray of excess water thereby to dissolve reducing metal chloride and to maintain the temperature of said refractory metal below about 30° C., subsequently immersing said washed metal in an aqueous acid solution until the reducing metal is dissolved, said acid solution being of such strength and in amount that the hydrogen ion content of the spent acid after treatment of the metal is not lower than 0.1 gram per liter, and rinsing and drying said metal.

References Cited in the file of this patent

UNITED STATES PATENTS

| Number | Name | Date |
|---|---|---|
| 1,028,774 | Perret | June 4, 1912 |
| 1,217,913 | Butterfield | Mar. 6, 1917 |
| 1,429,272 | Becket | Sept. 19, 1922 |
| 1,665,635 | Marden | Apr. 10, 1928 |
| 1,704,257 | Marden et al. | Mar. 5, 1929 |
| 1,728,941 | Marden | Sept. 24, 1929 |
| 2,200,139 | White | May 7, 1940 |
| 2,030,357 | Doom | Feb. 11, 1936 |
| 2,148,345 | Freudenberg | Feb. 21, 1939 |
| 2,205,854 | Kroll | June 25, 1940 |
| 2,537,068 | Lilliendahl et al. | Jan. 9, 1951 |
| 2,639,974 | Ross | May 26, 1953 |
| 2,690,421 | Lilliendahl et al. | Sept. 28, 1954 |

FOREIGN PATENTS

| 623,160 | Great Britain | May 12, 1949 |
|---|---|---|

OTHER REFERENCES

The Electrochemical Society, Preprint 78–11, Oct. 7, 1940, pp. 161–172. Article by Kroll.

Report of Investigations R. I. 4519, pub. Aug. 1949, by Bureau of Mines, D. C. Article by Wartman et al.